(12) United States Patent
Lovas et al.

(10) Patent No.: US 6,290,793 B1
(45) Date of Patent: Sep. 18, 2001

(54) STRESS-FREE LIQUID CRYSTAL CELL ASSEMBLY

(75) Inventors: Istvan Lovas, Mahopac; Minhua Lu, Mohegan Lake; Kei-Hsiung Yang, Katonah, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,146

(22) Filed: Jun. 16, 1998

(51) Int. Cl.$^7$ ...................................................... B32B 31/00
(52) U.S. Cl. ............................... 156/99; 156/581; 156/285
(58) Field of Search .............................. 156/99, 581, 285

(56) References Cited

U.S. PATENT DOCUMENTS

| | | | |
|---|---|---|---|
| 5,442,470 | * 8/1995 | Hashimoto | 359/83 |
| 5,499,127 | 3/1996 | Tsubota et al. | 359/80 |
| 5,568,297 | 10/1996 | Tsubota et al. | 359/80 |
| 5,629,787 | 5/1997 | Tsubota et al. | 349/153 |
| 5,677,749 | 10/1997 | Tsubota et al. | 349/160 |

FOREIGN PATENT DOCUMENTS

| | | |
|---|---|---|
| 54-85749 | 7/1979 | (JP) . |
| 55-62469 | 5/1980 | (JP) . |
| 56-85732 | 7/1981 | (JP) . |

* cited by examiner

Primary Examiner—Francis J. Lorin
(74) Attorney, Agent, or Firm—David M. Shofi

(57) ABSTRACT

A method of assembling a liquid crystal display device including a pair of substrates combined together with a sealing member and a liquid crystal interposed between the substrates, includes the steps of disposing a plurality of spacers in the area of the sealing member between the substrates, positioning a frame on an outside surface of each substrate, the frame being aligned with the sealing member, and applying pressure to each frame so that a region corresponding to a display area is substantially pressure-free and a uniform cell gap is obtained.

14 Claims, 3 Drawing Sheets

STRESS-FREE LIQUID CRYSTAL CELL ASSEMBLY

FIELD OF THE INVENTION

The present invention is directed to liquid crystal displays. Specifically, the present invention is directed to an apparatus and method of liquid crystal cell assembly having no spacers in the display area and virtually no stress across the cell.

BACKGROUND OF THE INVENTION

Conventionally, the dimensions of liquid crystal display ("LCD") cell gaps are controlled by spacers or spacer posts. Cell gap uniformity is determined by the size, density and distribution of the spacers. Spacers ensure that the LCD panels have correct cell gaps and support substrates, thereby preventing them from collapsing onto each other. However, liquid crystal molecules adjacent to the spacers in the display area are distorted from the corresponding bulk orientations. As a result, there are light leakages at the spacer locations. The problem is more pronounced in projection displays where miniature displays are viewed at ten or hundred times magnification. There, spacers appear as defective spots, degrading contrast ratio and image quality.

One approach to addressing this problem has been to place the spacers out of the display or viewing area, i.e. in the peripheral area and in between the pixel gap. For direct view displays, spacers can be hidden within the inter-pixel gap which, measuring about 10 $\mu$m, is larger than the cell gap. Therefore, the whole panel can be supported evenly. For projection displays, however, the inter-pixel gap is only about 1 $\mu$m or less. In this case, the spacers are visible even when placed at the corner of the pixel. Therefore, the spacers must be limited to the peripheral area in projection display devices to eliminate the spacer visibility problem.

FIG. 1 is an illustration of a conventional prior art LCD cell assembly method. Typically, during LCD panel assembly, an external force or pressure is applied over the entirety of one or both of the substrates by means of mechanical, compressed air or vacuum to press the substrates so that they both contact the spacers. In FIG. 1, external force is applied to a rigid plate 100 and a flat platform 110 which are disposed against the outside surfaces of two substrates 120 and 130, respectively. As a result of the pressure, the substrates 120, 130 both are made to contact the spacers 140. After the pressure is released, the panels either maintain a rather uniform cell gap or bowl up due to built-in stress. In the case where the panels bowl up, the cell gap will be corrected by another press during the end seal process after the injection of liquid crystal.

If, in this arrangement, the spacers 140 were eliminated from the viewing area to improve viewing quality, there would be no support to withstand the external pressure. For displays which have smaller than a half inch diagonal, the rigidity of the substrates 120, 130 might be enough to hold the gap without collapsing. However, for displays larger than a half inch, the two substrates will collapse onto each other. As a result, the cell gap would not be uniform and viewing quality would diminish.

One attempt to address this problem is disclosed in U.S. Pat. No. 5,499,127 issued Mar. 12, 1996 to Tsubota et al. In Tsubota et al., the invention of which is shown in FIG. 2, spacers 240 are located in a curing resin that forms the sealing member of the LCD devices. The two substrates 220, 230 (one coated with the sealing member) are initially pressed together with pressing plates 200, 210 until the spacers 240 are against each substrate, thereby forming a panel of the devices (not shown). Next, an elastic sheet 250 of glass fiber is disposed on the top substrate 220 adjacent the pressing plate 200. Portions of this elastic sheet 250 is cut out so that the remaining sheet is positioned over and in between the various sealing members 240. Upon a second pressing, the top substrate 220 is deformed such that the gap between the substrates 220, 230 is narrow at and outside the sealing member and is wide inside the sealing member. Thereafter, the sealing member is heat cured to reduce the built-in stress of the glue and a liquid crystal injection apparatus is used to restore some cell gap uniformity.

The method disclosed in Tsubota et al. has the following problems. First, the use of the single elastic sheet creates stress on the LCD device such that LCD cells are produced with 3–5 fringes associated with the Newton rings which are caused by the interference of the light from the two inner surfaces of the liquid crystal cell cavity when the cell gap is not uniform. In other words, cell gap distortion occurs and uniformity suffers. Second, the stress created by the disclosed method cannot be completely eliminated even after aneals before and after subsequent liquid crystal injection and end sealing. To improve the cell gap uniformity, the reduction of built-in stress is essential. Sealant breakage is very possible under this stress level. Third, since the substrates are not 100% rigid and flat, the bottom substrate 230 disposed directly against the pressing plate 210 is made to conform to the surface of that plate and away from that of the upper substrate 220. This results in a non-uniform cell gap. Finally, particles trapped between the bottom substrate 230 and the adjacently disposed plate 210 will distort the display.

It is an object of the present invention to provide an apparatus and method for assembling LCD devices which do not suffer from the problems listed hereinabove.

SUMMARY OF THE INVENTION

The LCD cell assembly apparatus and method of the present invention achieves cell gap uniformity while creating substantially zero stress and containing no spacers in the display area. Two frames are used to direct pressure to the sealant area only. With the novel two frame method, a uniform cell gap is created with little or no stress to the LCD panel. Experiments have shown that, in 70% of the cells assembled, no fringes are produced using the present invention. The other 30% have, at most, one fringe. The low stress and uniform cell gap resulting from the present invention relax the requirements for liquid crystal injection and end seal procedures found in the prior art. Furthermore, LCD devices assembled using the present invention have better long term reliability in terms of cell gap uniformity and peripheral seal quality. The two frame method of the present invention ensures that the substrates will not contact directly with the pressure application plates. Therefore, the substrates can conform to each other either in a concave or convex relationship such that the cell gap is uniform even though the shapes of the substrates have a certain curvature. Because the pressure in the present invention is applied only to the framed area, the pressure on the rest of the display areas is substantially zero and the problems caused by smoothness, flatness or rigidity of the substrates and pressure plates are avoided.

In another aspect of the present invention, two frames of the apparatus of the present invention can be positioned relative to each other according to the type and size of the displays in order to optimize cell gap uniformity. Because neither substrate is directly in contact with a pressure plate, there is no concern for non-uniformity due to trapped particles.

Finally, because the present invention results in a uniform cell gap and substantially zero stress, the glue used for the sealant can be fully cured by UV irradiation only without the need for heating.

This spacerless cell assembly method of the present invention can be applied to LCD cells with one or both of the substrates made of the following materials: Si-wafer, glass, quartz, and plastic material.

Specifically, the present invention provides a method of assembling a liquid crystal display device including a pair of substrates combined together with a sealing member and a liquid crystal interposed between the substrates, the method including the steps of disposing a plurality of spacers in the area of the sealing member between the substrates; positioning a frame on an outside surface of each substrate, the frame being aligned with the sealing member; and applying pressure to each frame so that a region corresponding to a display area is substantially pressure-free and a uniform cell gap is obtained.

Preferably, the frame has a shape of the sealing member of the liquid crystal display device and is made of rubber, plastic, metal and composite, or any type of material which can serve as pressure transfer media. The frame preferably has a solid structure to fulfill the requirement of transferring a desired pressure.

Pressure can be applied by means of a mechanical, compressed gas or vacuum device.

Preferably, a plurality of sealing spacers are disposed in the area of the sealing member between the substrates and a plurality of display spacers are disposed in the display area. The sealing spacers are preferably higher density spacers and the display spacers are preferably lower density spacers. The spacers are preferably formed as balls or posts and are manufactured by photolithographic means.

One of the substrates of the liquid crystal display device preferably includes active matrix elements such as thin film transistors made of crystalline silicon, polycrystalline silicon, or amorphous silicon. Alternatively, the liquid crystal display device can be a passive-matrix-addressed LCD. The substrates are, preferably, made of silicon, glass, quartz, plastic, a dielectric or a metal.

The liquid crystal display device is either a single-cell assembly or a multi-cell assembly where large substrates containing a plurality of liquid crystal cells are used.

The sealing member can include thermal, UV or UV thermal sealants.

The present invention also provides an apparatus for assembling a liquid crystal display device including a pair of substrates and a sealing member located on an inside surface of the substrates for bonding the substrates, the sealing member having at least one spacer for determining a cell gap between the substrates, the apparatus including two frames, each disposed on an outside surface of one of the substrates, and means for applying a pressure to the frames such that stress on the liquid crystal device in a region corresponding to the display area is substantially zero and the cell gap is uniform.

The frames preferably have a shape of the sealing member and is made of rubber, plastic, metal and composite, or any type of material which can serve as pressure transfer media. The frame preferably has a solid structure to fulfill the requirement of transferring a desired pressure.

The pressure applying means can include a mechanical, compressed gas or vacuum device.

The apparatus can further include a plurality of display spacers in the display area. The at least one spacer in the sealing member is preferably a higher density spacer and the display spacers are preferably lower density spacers. The spacers are balls or posts and are preferably manufactured by photolithographic means.

One of the substrates of the liquid crystal display device preferably includes active matrix elements such as thin film transistors made of crystalline silicon, polycrystalline silicon, or amorphous silicon. Alternatively, the liquid crystal display device can be a passive-matrix-addressed LCD. The substrates are, preferably, made of silicon, glass, quartz, plastic, a dielectric or a metal. The substrates are preferably made of silicon, glass, quartz, plastic, a dielectric or a metal.

The liquid crystal display device is either a single-cell assembly or a multi-cell assembly where large substrates containing a plurality of liquid crystal cells are used.

The sealing member preferably comprises thermal, UV or UV thermal sealants.

BRIEF DESCRIPTION OF THE DRAWING

Further objects, features, and advantages of the present invention will become apparent from a consideration of the following detailed description of the invention when read in conjunction with the drawing figures in which.

DETAILED DESCRIPTION

Figure 1:
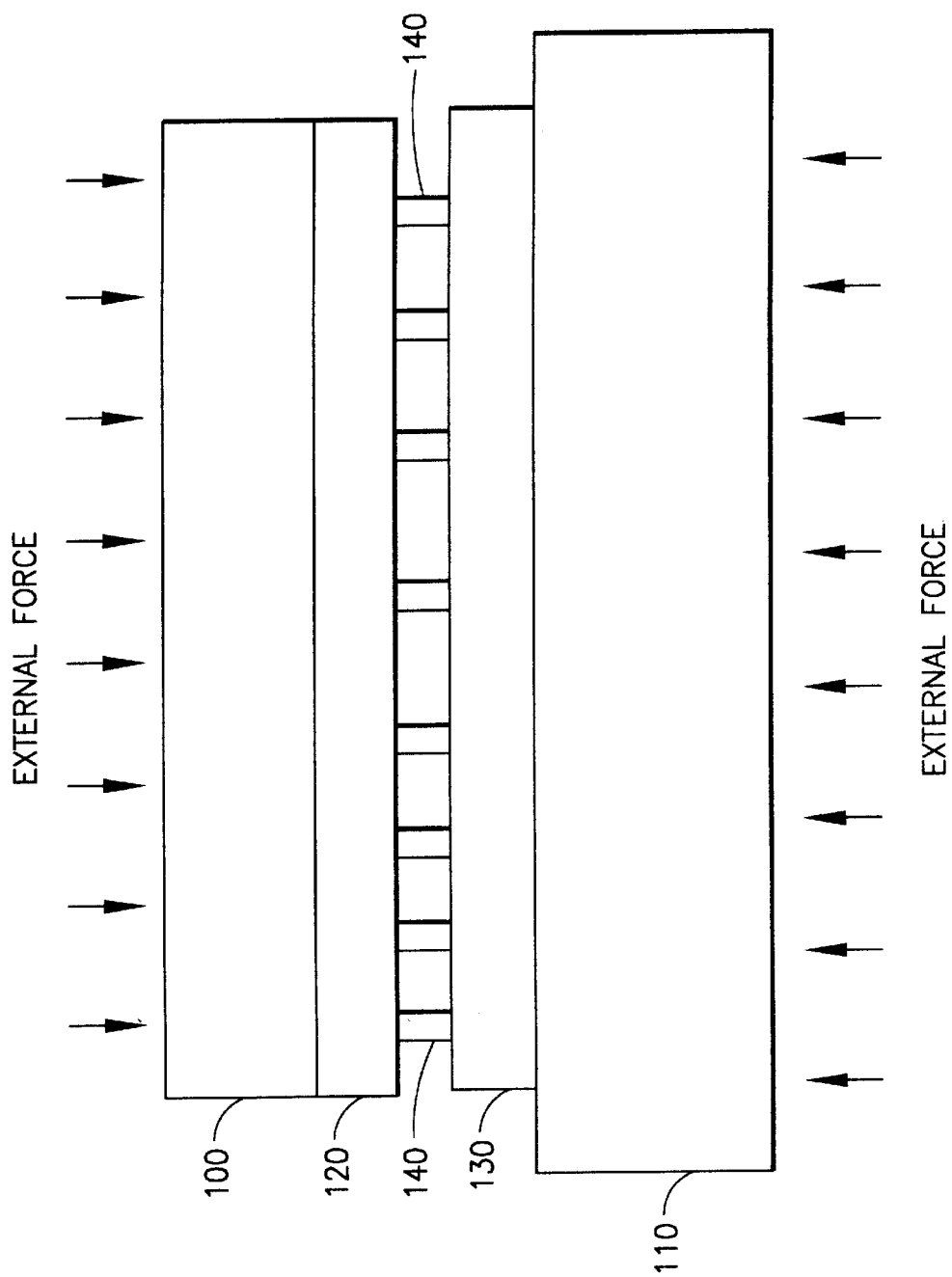
FIG. 1 depicts an LCD cell assembly method of the prior art.
Figure 2:
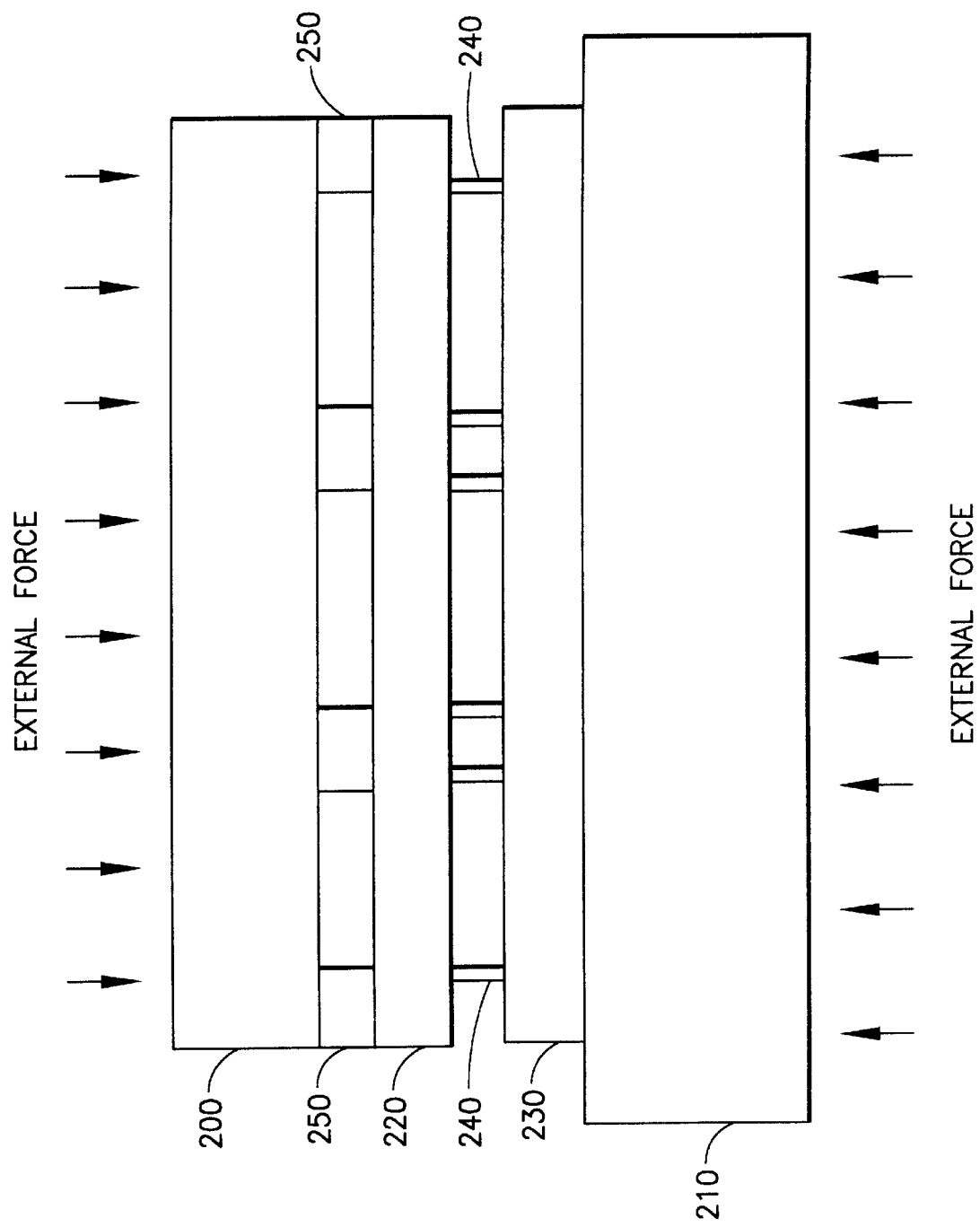
FIG. 2 depicts another LCD cell assembly method of the prior art.
Figure 3:
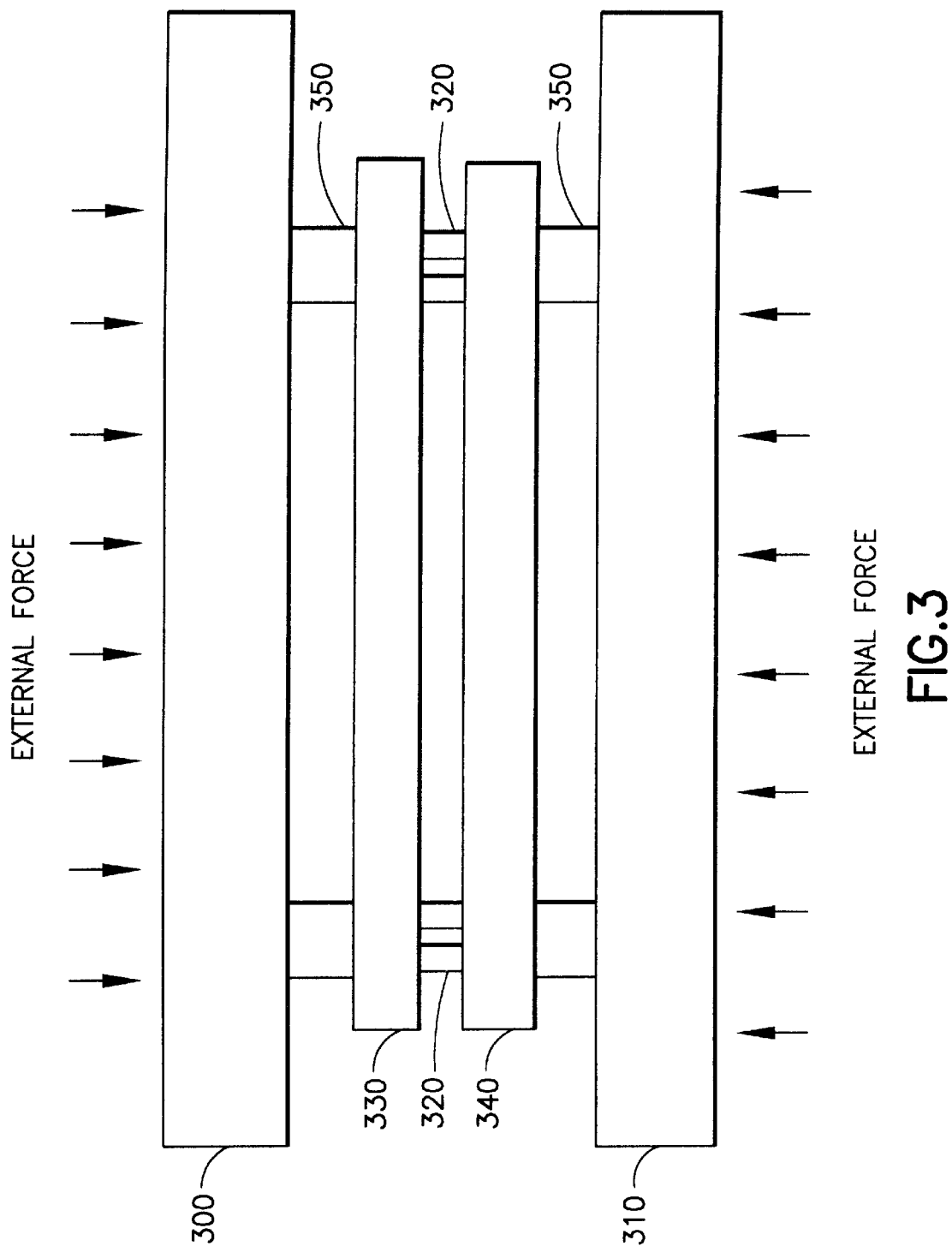
FIG. 3 depicts the LCD cell assembly method of the present invention.

FIG. 3 shows the stress-free, spacerless LCD cell assembly method of the present invention. Two pressure plates 300, 310 are used to assemble the cells. As described hereinabove, the pressure can be achieved by mechanical, compressed air or vacuum means. Pressure plate 300 should be UV transparent to permit curing of the sealant (if UV-curable sealant is used). Pressure plate 310 can be made of an opaque material. Spacers 320 are disposed in the peripheral regions of the cell only between the two substrates 330, 340 (only one cell is depicted in FIG. 3). The spacers 320 can be formed as balls or posts. Substrates 330, 340 can be formed of silicon, glass, plastic, dielectric or metal. The spacers 320 can be made on the substrates 330, 340 by means of photolithography or can be mixed in the sealant and dispensed onto the substrates 330, 340. Two frames 350, which have the shape of the peripheral sealant, are placed on both sides of the panel (on the outside of each substrate) such that they are aligned with the sealant pattern (while only the sides of each frame is depicted in FIG. 3, four sides actually exist if the sealant is in the shape of a rectangle). When pressure is applied by the pressure plates 300, 310, the frames 350 transfer the pressure to the regions of the cell which have spacers 320. As a result, the array areas are pressure-free and the substrates 330, 340 will not collapse onto each other. That is, since the pressure is only applied to where the cell has supports, there is no stress built into the display area which does not have spacers to separate the two substrates. Consequently, the cell gap remains uniform and unchanged even after the pressure is removed. Because, for liquid crystal on silicon displays, different mechanical properties exist between silicon and glass, built-in stress may cause a long-term stability problem. This assembly method eliminates this problem by eliminating the built-in stress.

The frames can be made of rubber, plastic, metal and composite or any type of material which can serve as a satisfactory pressure transfer medium. Preferably, its structure is solid.

This assembly method can be used on LCD displays with a 0.5" to 3.0" diagonal. The cell gap uniformity of the resulting cells are within one fringe or better. This cell assembly method can be used to assemble LC cells with either thermal, UV or UV thermal glue as peripheral sealant. The pressure application mechanism can be either mechanical, compressed gas or vacuum.

Depending on the materials used in the cell, the frames and pressure transfer mechanisms can be selected accordingly to satisfy the different requirements. For example, UV transparent material must be used for at least one piece of frame and pressure transfer plate if a UV or UV thermal sealant is used in LC cell.

Furthermore, the frames can be positioned relative to each other, depending on the substrate characteristics, to optimize the cell gap uniformity.

While the present invention has been described with respect to preferred embodiments, numerous modifications, changes, and improvements will occur to those skilled in the art without departing from the spirit and scope of the invention. For instance, it may be effective to provide a certain number of spacers to the array or display area to optimize cell gap uniformity under certain conditions and with certain materials. In this case, the spacers located in the sealant (peripheral) region preferably are of higher density than the spacers in the array region.

We claim:

1. A method of assembling a liquid crystal display device including a pair of substrates combined together with a sealing member and a liquid crystal interposed between the substrates, the method comprising the steps of:

disposing a plurality of spacers in the area of the sealing member between the substrates;

positioning a frame on an outside surface of each substrate, the frame being aligned with the sealing member; and applying pressure to each frame so that a region corresponding to a display area is substantially pressure-free and a uniform cell gap is obtained.

2. The method of claim 1 wherein the frame has a shape of the sealing member of the liquid crystal display device.

3. The method of claim 1 wherein the frame is made of rubber, plastic, metal and composite, or any type of material which can serve as pressure transfer media.

4. The method of claim 1 wherein the frame has a solid structure to fulfill the requirement of transferring a desired pressure.

5. The method of claim 1 pressure applying step comprises the step of applying pressure by means of a mechanical, compressed gas or vacuum device.

6. The method of claim 1 wherein the disposing step comprises the step of disposing a plurality of sealing spacers in the area of the sealing member between the substrates, the method further comprising the step of providing a plurality of display spacers in the display area.

7. The method of claim 6 wherein the sealing spacers are higher density spacers and the display spacers are lower density spacers.

8. The method of claim 1 wherein the spacers are formed as balls or posts.

9. The method of claim 1 wherein the spacers are manufactured by photolithographic means.

10. The method of claim 1 wherein one of the pair of substrates comprises active matrix elements such as thin film transistors made of crystalline silicon, polycrystalline silicon, or amorphous silicon.

11. The method of claim 1 wherein the liquid crystal display device is a passive-matrix-addressed LCD.

12. The method of claim 1 wherein the substrates are made of silicon, glass, quartz, plastic, a dielectric or a metal.

13. The method of claim 1 wherein the liquid crystal display device is a single-cell assembly or a multi-cell assembly where large substrates containing a plurality of liquid crystal cells are used.

14. The method of claim 1 wherein the sealing member comprises thermal, UV or UV thermal sealants.

* * * * *